United States Patent
Urashima et al.

(10) Patent No.: US 10,322,686 B2
(45) Date of Patent: *Jun. 18, 2019

(54) GROMMET

(71) Applicant: YAZAKI CORPORATION, Tokyo (JP)

(72) Inventors: Tomohiro Urashima, Tochigi (JP); Hiroyuki Sasaki, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,506

(22) Filed: Apr. 23, 2018

(65) Prior Publication Data

US 2018/0304834 A1   Oct. 25, 2018

(30) Foreign Application Priority Data

Apr. 25, 2017  (JP) ................. 2017-086560

(51) Int. Cl.
  *F16L 5/00*  (2006.01)
  *H02G 3/22*  (2006.01)
  *B60R 16/02*  (2006.01)

(52) U.S. Cl.
  CPC ............... *B60R 16/0222* (2013.01)

(58) Field of Classification Search
  CPC ... Y10T 16/05; Y10T 16/063; B60R 16/0222; B60R 16/0207; B60R 16/0215; H02G 3/22; H02G 3/0468; H02G 3/0481; H02G 15/013; F16L 5/10; F16B 5/0258; F16B 43/001; H01R 13/5205; H01R 13/5208; H01B 17/24; H01B 17/583
  See application file for complete search history.

(56) References Cited

U.S. PATENT DOCUMENTS

| 6,312,046 | B1 * | 11/2001 | Sora ................... B60R 16/0222 174/152 G |
| 6,431,642 | B2 * | 8/2002 | Sora ................... B60R 16/0222 174/152 G |
| 6,660,937 | B1 * | 12/2003 | MacLeod ............ B60R 16/0222 16/2.2 |

(Continued)

FOREIGN PATENT DOCUMENTS

| JP | 2013-141363 A | 7/2013 |
| JP | 2013-151214 A | 8/2013 |
| JP | 2015-204254 A | 11/2015 |

*Primary Examiner* — Chuck Y Mah

(74) *Attorney, Agent, or Firm* — Kenealy Vaidya LLP

(57) ABSTRACT

A grommet includes a hollow grommet main body comprising an elastic material and a protector placed in a hollow space of the grommet main body. The protector has a deep-side end portion located in a deep-side area of the hollow space, an opening-end-side end portion located in an opening-end-side area of the hollow space, and a protector-side engagement portion engaged with the grommet main body when the protector is placed in the grommet main body. The grommet main body has a grommet-main-body-side engagement portion to exert a preventive force to the protector-side engagement portion for preventing separation of the protector from the grommet main body, while eliminating a structure to exert the preventive force to the opening-end-side end portion.

4 Claims, 8 Drawing Sheets

(56) References Cited

U.S. PATENT DOCUMENTS

| | | | | |
|---|---|---|---|---|
| 7,244,894 B1* | 7/2007 | Lipp | ................... | B60R 16/0222 |
| | | | | 16/2.1 |
| 7,420,125 B2* | 9/2008 | Tsukamoto | ......... | B60R 16/0222 |
| | | | | 16/2.1 |
| 7,423,224 B2* | 9/2008 | Puhl | ................... | B60R 16/0215 |
| | | | | 16/2.1 |
| 7,615,713 B2* | 11/2009 | Bardella | ............. | B60R 16/0215 |
| | | | | 16/2.1 |
| 8,925,147 B2* | 1/2015 | Furuta | ................... | B60J 5/0418 |
| | | | | 16/2.1 |
| 2006/0243484 A1* | 11/2006 | Serizawa | ........... | B60R 16/0207 |
| | | | | 174/659 |
| 2015/0305174 A1 | 10/2015 | Yoshimura et al. | | |

* cited by examiner

GROMMET

CROSS-REFERENCES TO RELATED APPLICATION(S)

This application is based on and claims priority from Japanese Patent Application No. 2017-086560 filed on Apr. 25, 2017, and the entire contents of which are incorporated herein by reference.

BACKGROUND

The present invention relates to a grommet having a grommet main body formed of an elastic material and shaped like a hollow cylinder, and a protector placed in the hollow space of the grommet main body.

From the viewpoint of water stopping in routing electric wires in a machinery such as vehicles, a grommet having a support body (a protector) placed in a hollow space of a hollow elastic body (a grommet main body) has been used. For example, one of such grommet in the background art is configured to enable the water stopping between an outer wall surface of the grommet main body and an attachment surface of an attachment target panel such as a vehicle door by fixing the grommet main body to the attachment target panel while pressing the grommet main body to contact the attachment target panel.

In addition, for discrimination from grommets that are disposed in a through-hole of an attachment target panel, grommets of the above kind may be called "penetration-less grommets."

As for details of the above grommet, refer to JP 2015-204254 A.

SUMMARY

In the above-described grommet, the protector is inserted into the hollow space of the grommet main body through an insertion opening as one open end of the hollow space. In this grommet, to prevent a positional deviation (and resulting unintentional separation) of the protector that is housed in the grommet main body, an open-end-side end portion of the protector is covered with a cover portion that extends from the edge of the insertion opening so as to close the insertion opening partially.

However, in the grommet, the opening area of the insertion opening is smaller than the corresponding area of the other part of the grommet main body due to the presence of the cover portion. As a result, a worker needs to, for example, insert the protector into the hollow space of the grommet main body while pushing and expanding the cover portion. This lowers the efficiency of work of inserting the protector into the grommet main body.

An object of the present invention is to provide a grommet capable of increasing the efficiency of work of inserting a protector into a grommet main body while preventing the protector from coming off the grommet main body.

Embodiments of the present invention provide the following items (1) to (3).

(1)

A grommet comprising:

a hollow grommet main body comprising an elastic material; and a protector placed in a hollow space of the grommet main body, the protector having: a deep-side end portion located in a deep-side area of the hollow space; an opening-end-side end portion located in an opening-end-side area of the hollow space; and a protector-side engagement portion engaged with the grommet main body upon the protector being placed in the grommet main body, the grommet main body having a grommet-main-body-side engagement portion to exert a preventive force to the protector-side engagement portion for preventing separation of the protector from the grommet main body, while eliminating a structure to exert the preventive force to the opening-end-side end portion.

(2)

The grommet according to the item (1), wherein the hollow space of the grommet main body has a bent portion to have a bent shape, the protector has: a first protector portion extending toward one side from the bent position along the shape of the hollow space; and a second protector portion extending toward the other side from the bent position along the shape of the hollow space, the protector-side engagement portion has a rib shape connecting an outer wall surface of the first protector portion and an outer wall surface of the second protector portion.

According to first aspect of the invention, relating to the item (1), preventive forces for preventing the protector from separating from the grommet main body unintentionally are exerted on the protector-side projections from the grommet-main-body-side recesses and there is no structure for exerting a preventive force on the opening-end-side end portion of the protector. This makes work of inserting the protector into the hollow space of the grommet main body easier than in the case that the structure of the background-art grommet (i.e., the structure that the cover portion extends so as to close the insertion opening partially) is provided.

As such, the grommet having this configuration can increase the efficiency of work of inserting the protector into the grommet main body while preventing the protector from coming off the grommet main body.

According to second aspect of the invention, relating to the item (2), the protector-side projections are shaped like ribs that connect the outer wall surface of the first protector portion and the outer wall surface of the second protector portion. As such, the protector-side projections have not only the function of locking the protector on the grommet main body but also a function of reinforcing the portions where the first protector portion and the second protector portion are connected to each other. As a result, the grommet having this configuration is given the protector that not only is prevented from being separated from the grommet main body unintentionally but also is high in strength.

As described above, according to the invention, a grommet capable of increasing the efficiency of work of inserting a protector into a grommet main body while preventing the protector from coming off the grommet main body is provided.

Several aspects of the invention have been described briefly above. The further details of the invention will be made clearer if the following description is read through with reference to the accompanying drawings.

DETAILED DESCRIPTION

<Embodiment>

A grommet according to an embodiment of the present invention will be hereinafter described with reference to the drawings.

Figure 1:
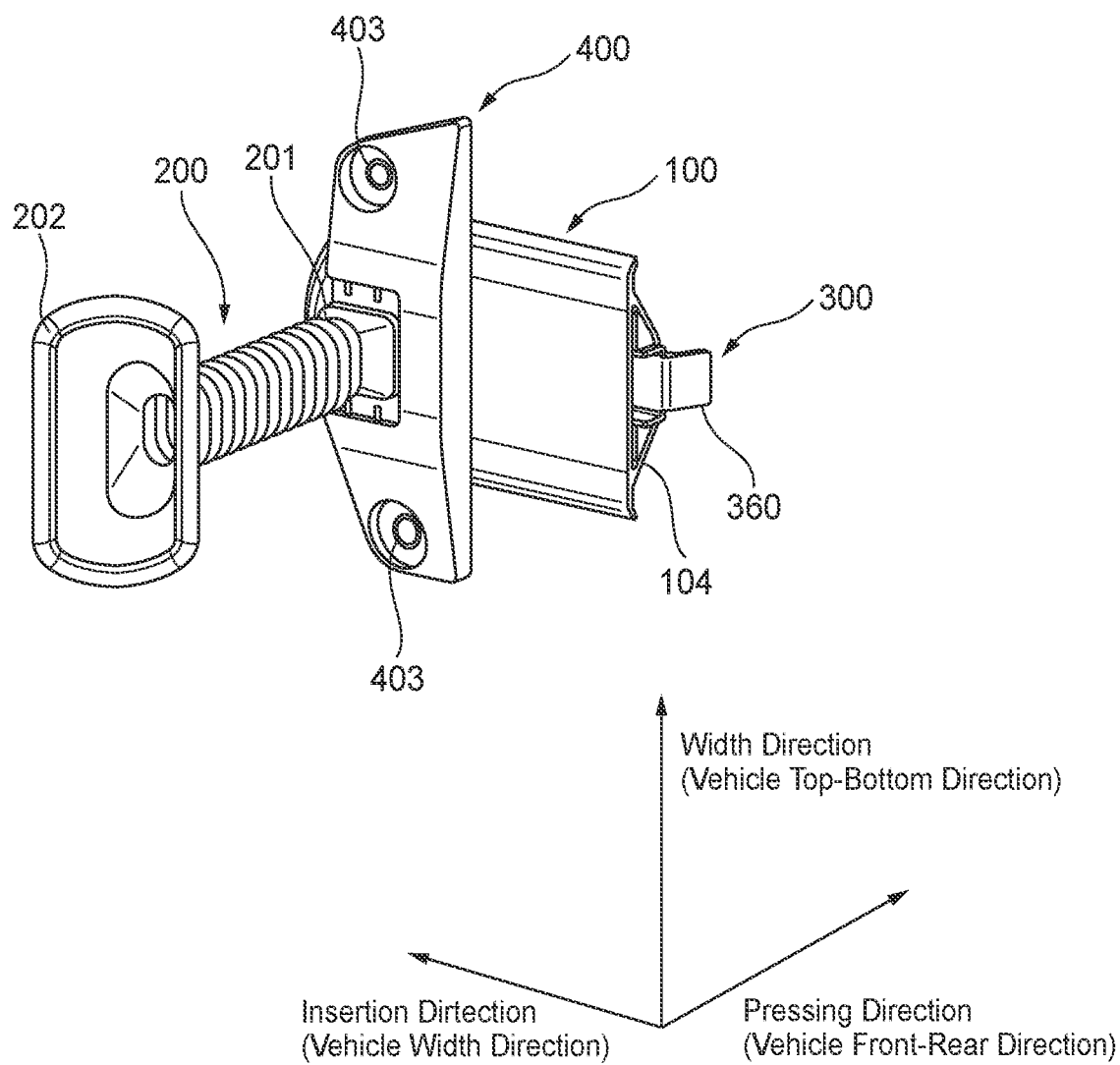
FIG. 1 is a perspective view of the whole of a grommet according to an embodiment of the present invention.

As shown in FIG. 1, the grommet according to the embodiment of the invention is equipped with a grommet main body 100, a tubular member 200 which is integrated with the grommet main body 100, a protector 300 which is inserted and housed in the grommet main body 100, and an outer member 400 which is attached to the grommet main body 100.

The grommet according to the embodiment is typically attached to an attachment surface (not shown) of an attachment target panel (inner panel) such as a vehicle door so as to be in pressure contact with it, and serves to attain water stopping between the grommet and the attachment surface and to route a wire harness (not shown) between an inside space and an outside space that are bounded by the attachment target panel. The grommet according to the embodiment is what is called a penetration-less grommet to be used for an attachment target panel not having a through-hole through which a wire harness is to penetrate.

For convenience of description, a "pressing direction," an "insertion direction," and a "width direction," which are perpendicular to each other, are defined as shown in FIG. 1. The pressing direction corresponds to a direction in which the grommet main body 100 is pressed against an attachment surface of an attachment target panel, and the insertion direction corresponds to a direction in which the protector 300 is inserted into the grommet main body 100.

Figure 2A:
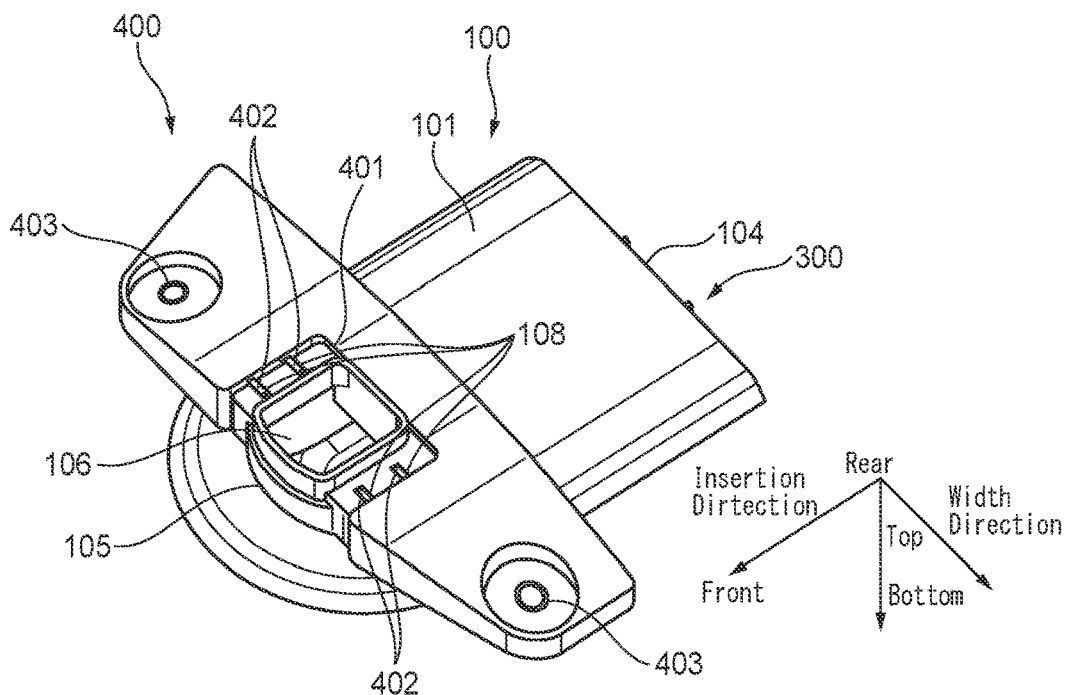
FIG. 2A is a perspective view, as viewed from the front side, showing the grommet with a tubular member omitted.
Figure 2B:
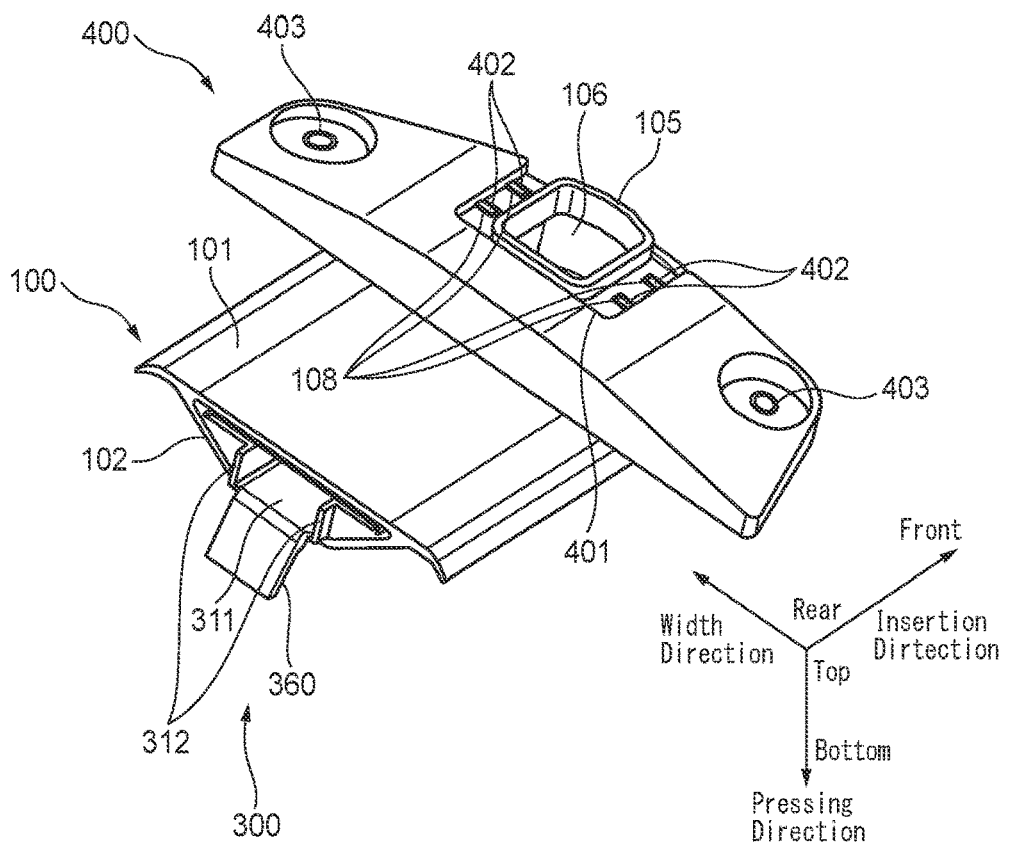
FIG. 2B is a perspective view, as viewed from the rear side, showing the grommet with the tubular member omitted.

For example, as mentioned above, the grommet according to the embodiment is attached to an attachment target panel (inner panel) of a vehicle door, as shown in FIG. 1 the grommet is attached with such orientation that the pressing direction, the insertion direction, and the width direction correspond to the vehicle front-rear direction, the vehicle width direction, and the vehicle top-bottom direction, respectively. The individual members of the grommet according to the embodiment will be described below in order. For convenience of description, the top side and the bottom side are also defined for the pressing direction and the front side and rear side are also defined for the insertion direction in the manners shown in FIGS. 2A and 2B.

Figure 3:
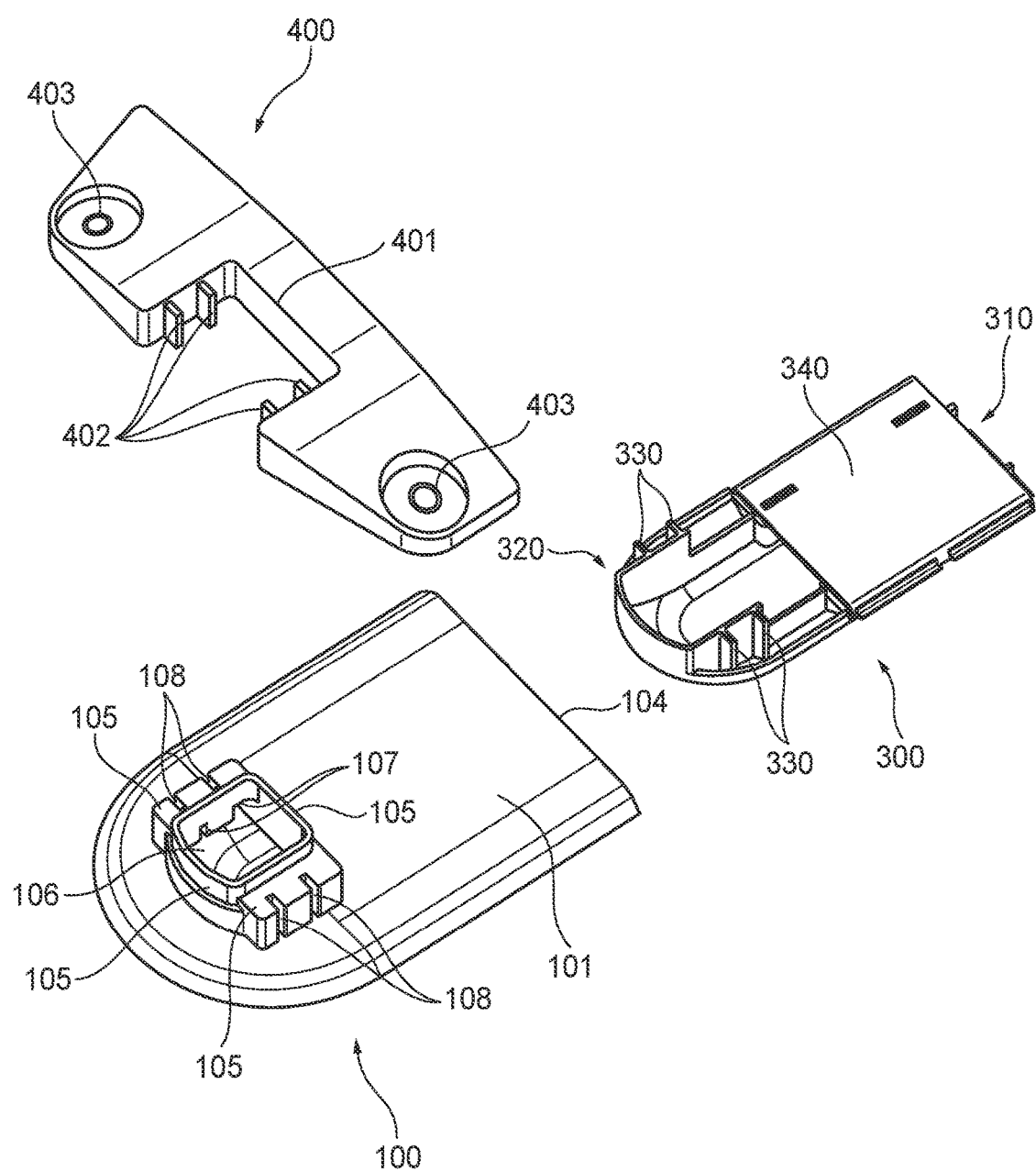
FIG. 3 is a perspective view of a grommet main body, a protector, and an outer member which are members of the grommet.

First, the grommet main body 100 will be described with reference to FIGS. 1, 2A, 2B, 3, 5A and 5B, 6, 7A and 7B, and 8 (mainly FIG. 3). The grommet main body 100 is formed so as to be unitized as a whole using, for example, a flexible elastic material that is low in stiffness such as rubber or a thermoplastic elastomer (a specific example is ethylene propylene diene monomer (EPDM) rubber).

The grommet main body 100 has a top wall 101 and a bottom wall 102. The top wall 101 and the bottom wall 102 extend in the insertion direction. When viewed from the pressing direction, the top wall 101 and the bottom wall 102 have approximately the same shape: their front end surfaces are arc-shaped and project forward and their rear end surfaces extend straightly in the width direction. Whereas the top wall 101 is shaped like a flat plate, the bottom wall 102 has what is called a ship bottom shape in which a central portion in the width direction extends in the insertion direction and projects downward.

Side edges in the width direction and front edges of the top wall 101 and the bottom wall 102 are continuous with each other, that is, are unitized there, over their full extension. As a result, a first hollow space 103 (see FIGS. 2B and 6) extending in the insertion direction is formed between the top wall 101 and the bottom wall 102 and the rear end surfaces of the top wall 101 and the bottom wall 102 (i.e., the rear end surface of the grommet main body 100) form an opening that is the rear end of the first hollow space 103. This opening serves as an insertion opening 104 through which to insert the protector 300.

Figure 6:
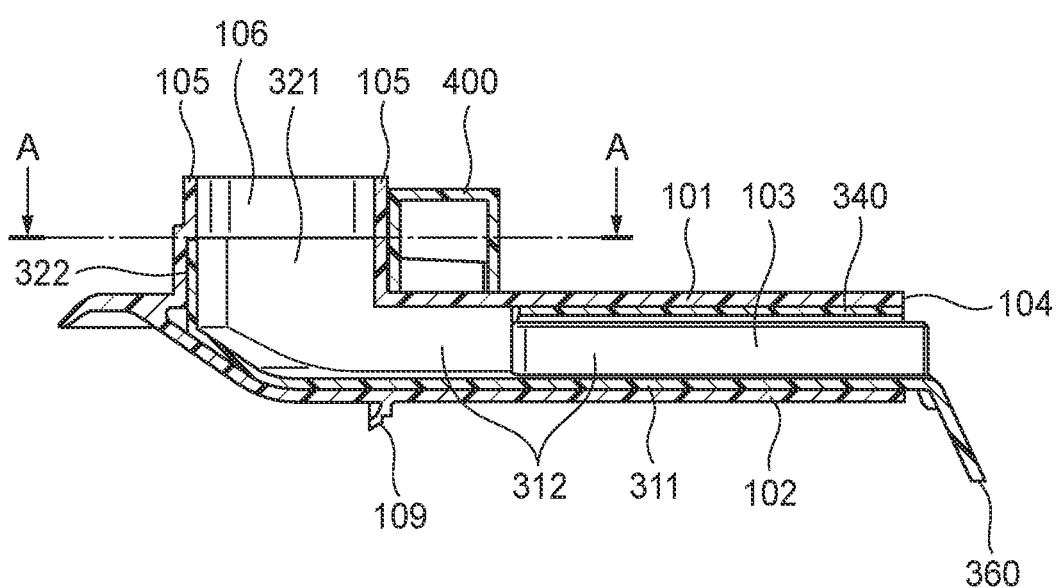
FIG. 6 is a sectional view, taken along an insertion direction, of an essential part of the grommet.

The top wall 101 is formed with a connection portion 105 at a position that is located on the front side of the center in the insertion direction and approximately at the center in the width direction. The connection portion 105 rises upward so as to be approximately shaped like a rectangular cylinder. A second hollow space 106 extending in the pressing direction is formed inside the connection portion 105 which is approximately shaped like a rectangular cylinder. A portion, corresponding to the connection portion 105, of the top wall 101 is opened. As a result, as shown in FIG. 6, a front end portion of the first hollow space 103 and a bottom end portion of the second hollow space 106 communicate with each other, whereby one hollow space is formed inside the grommet main body 100 so as to connect the insertion opening 104 which is the rear end of the first hollow space 103 and the top opening of the second hollow space 106. As such, the grommet main body 100 is a hollow body made of an elastic material.

In the approximately rectangular-cylinder-shaped connection portion 105, a pair of side walls that extend in the insertion direction are thicker than a front wall and a rear wall that extend in the width direction. As shown in FIG. 3, the inner wall surface of each side wall of the connection portion 105 is formed with plural (in this example, two) first grommet-main-body-side recesses 107 which are spaced from each other in the insertion direction, and the outer wall surface of each side wall of the connection portion 105 is formed with plural (in this example, two) second grommet-main-body-side recesses 108 which are spaced from each other in the insertion direction.

Each first grommet-main-body-side recess 107, which is formed in the inner wall surface of the associated side wall of the connection portion 105, is recessed outward in the width direction and extends from the bottom end to a halfway position in the pressing direction. Each second grommet-main-body-side recess 108, which is formed in the outer wall surface of the associated side wall of the connection portion 105, is recessed inward in the width direction and extends from the bottom end to the top end in the pressing direction.

Figure 5A:
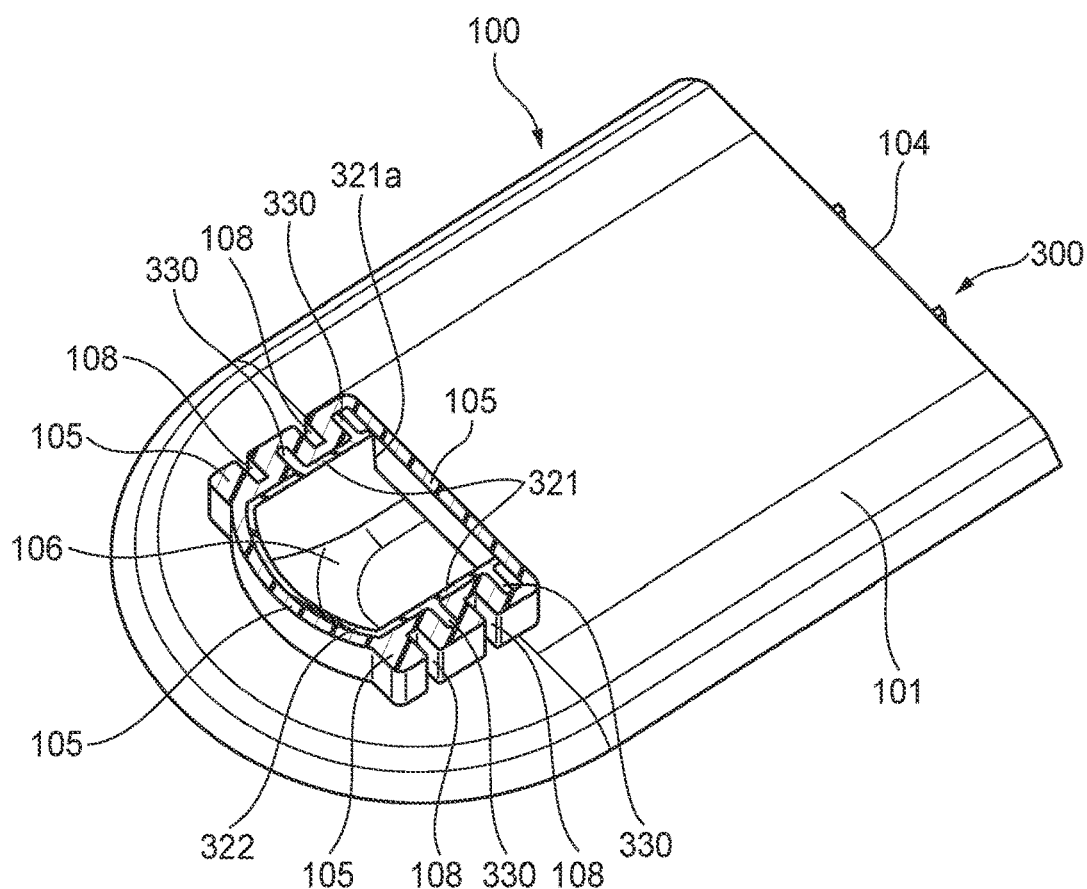
FIG. 5A is a perspective view, having a cross section taken along line A-A in FIG. 6, of the grommet main body in which the protector is housed.
Figure 5B:
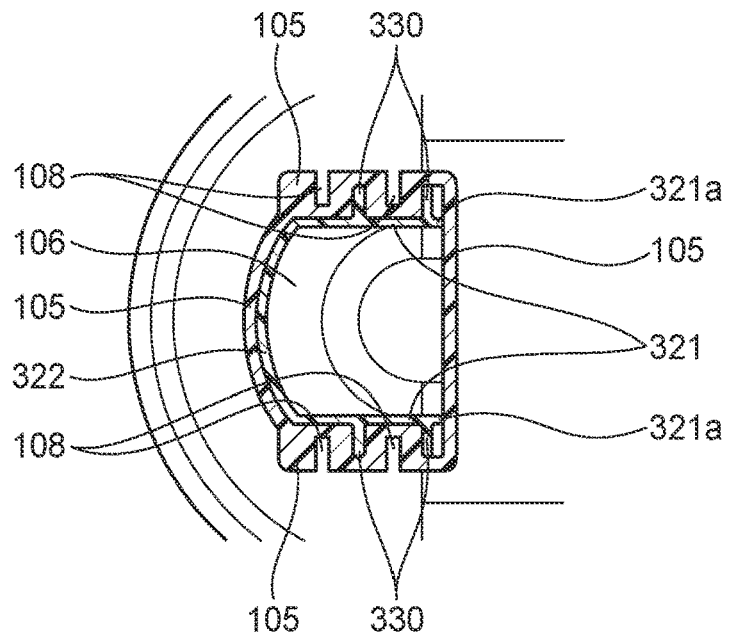
FIG. 5B is a top view, having a cross section taken along line A-A in FIG. 6, of part of the grommet main body in which the protector is housed.
Figure 7A:
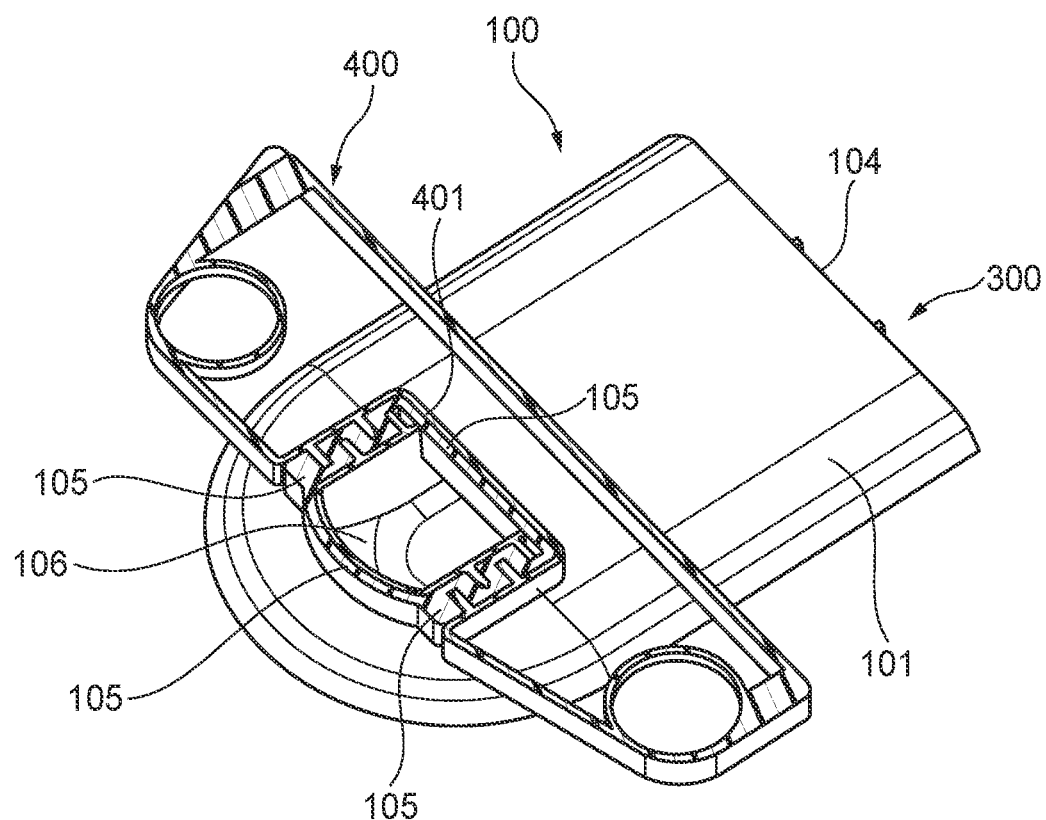
FIG. 7A is a perspective view, having a cross section taken along line A-A in FIG. 6, of the grommet.
Figure 7B:
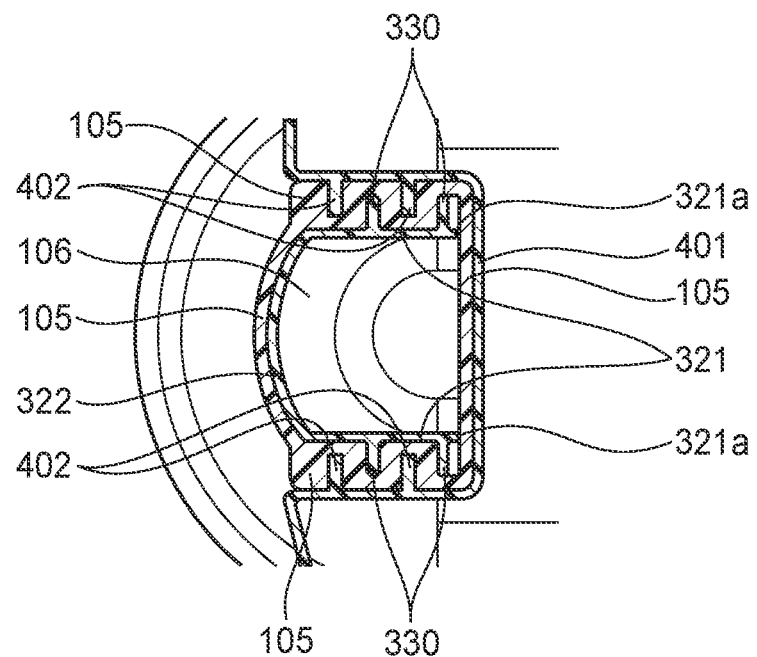
FIG. 7B is a top view, having a cross section taken along line A-A in FIG. 6, of part of the grommet.

As shown in FIGS. 5B and 7B, in each side wall of the connection portion 105, the plural first grommet-main-body-side recesses 107 and the plural second grommet-main-body-side recesses 108 are arranged alternately in the insertion direction and each of the first grommet-main-body-side recesses 107 is opposed to an adjacent one or ones of the second grommet-main-body-side recesses 108 so that their bottom portions overlap with each other in the width direction. In other words, in each side wall of the connection portion 105, a portion of the side wall of the connection portion 105 exists between a portion of the side wall of the connection portion 105 exists between each pair of first grommet-main-body-side recess 107 and second grommet-main-body-side recess 108 that are adjacent to each other in the insertion direction.

Figure 8:
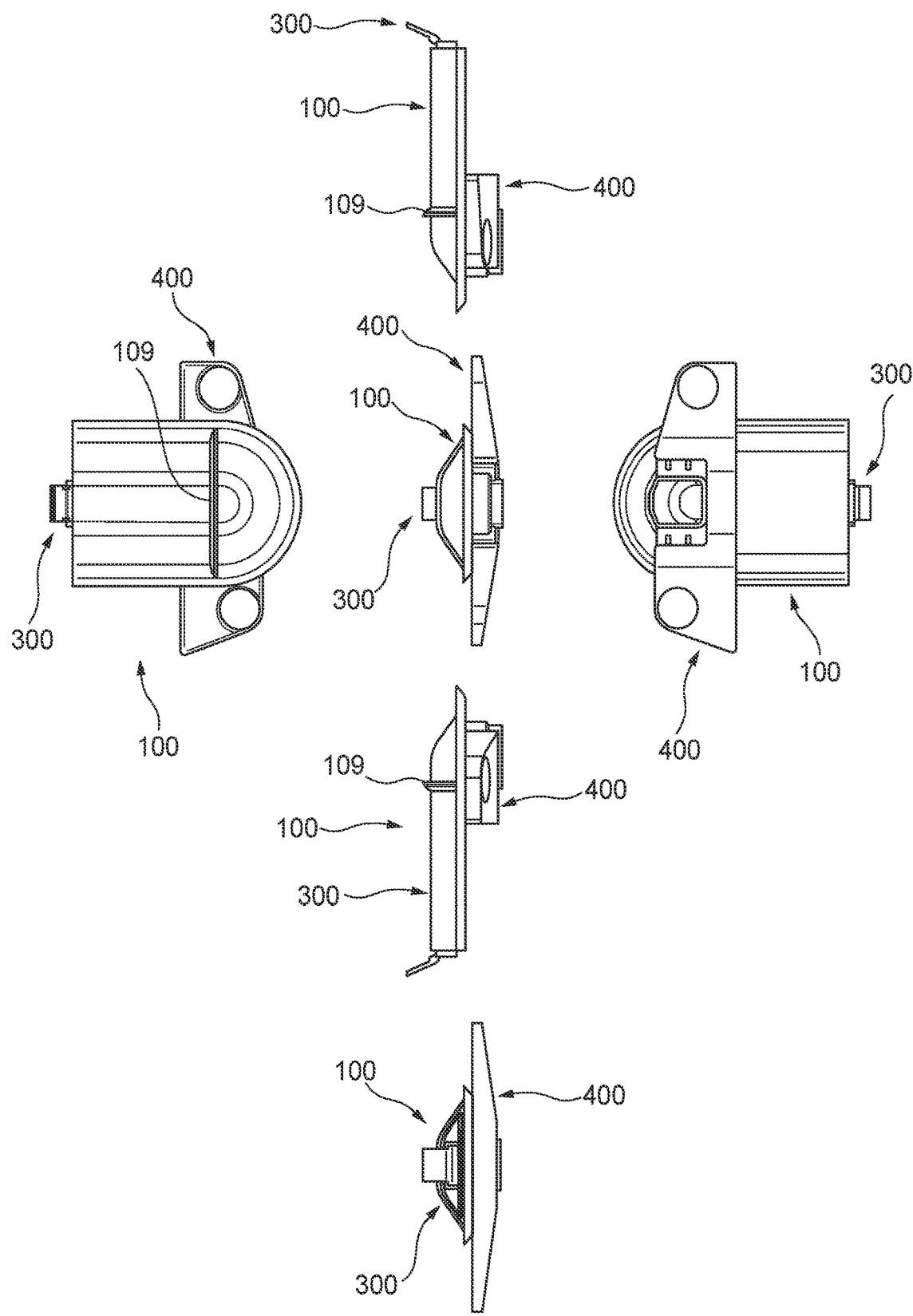
FIG. 8 is a six-sided view showing the grommet with the tubular member omitted.

As shown in FIGS. 6 and 8, a lip 109 projecting downward over approximately the entire length in the width direction is unitized with the bottom wall 102 at such a position as to correspond to the rear wall of the connection portion 105 in the insertion direction. The lip 109 has a function of water stopping between the grommet main body 100 and an attachment surface of an attachment target panel by coming into close contact with the attachment surface when the grommet main body 100 is attached to the attachment surface so as to be in pressure contact with it.

Next, the tubular member 200 will be described with reference to FIG. 1. The tubular member 200 is a bellows-shaped tube extending upward (in FIG. 1, in the pressing direction (vehicle front-rear direction)) whose one end portion 201 is integrated with a top end portion (see FIGS. 2A and 2B, 3, 6, and 8) of the connection portion 105 of the grommet main body 100.

The internal space of the tubular member 200 communicates with the second hollow space 106 (i.e., the hollow space of the grommet main body 100). Thus, one hollow space is formed inside the grommet main body 100 and the tubular member 200 so as to connect the insertion opening 104 which is the rear end of the first hollow space 103 and an opening, located on its other side, of the tubular member 200. The opening, located on its other side, of the tubular member 200 is provided with a grommet to be connected to another member (typically, a vehicle-body-side member).

Although described later in detail, the protector 300 is set in the hollow space (the first hollow space 103 plus the second hollow space 106) of the grommet main body 100 and a wire harness that is inserted through the protector 300 is routed so as to penetrate through the hollow space (the first hollow space 103 plus the second hollow space 106 plus the internal space of the tubular member 200) of the grommet main body 100 and the tubular member 200.

Figure 4A:
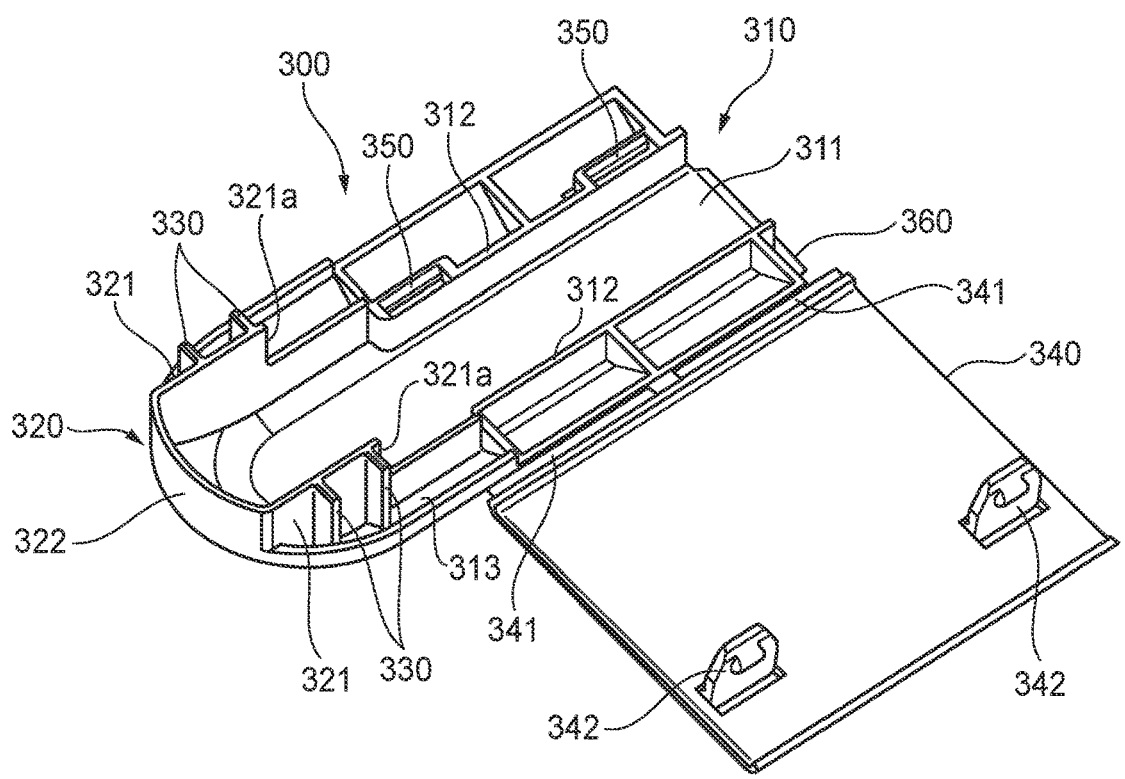
FIG. 4A is a perspective view of the protector whose cover is open.
Figure 4B:
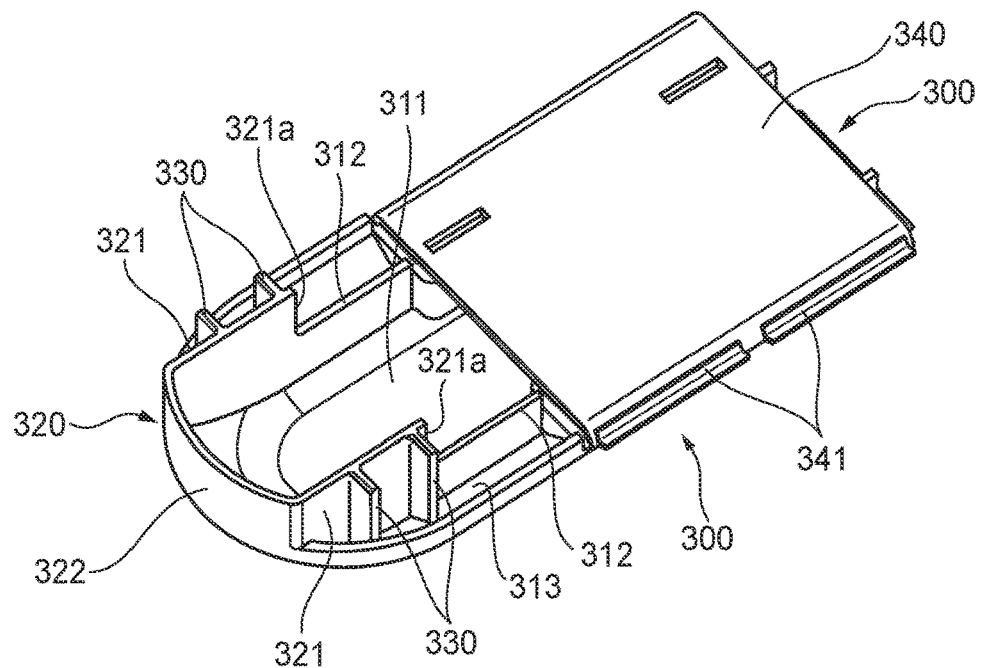
FIG. 4B is a perspective view of the protector whose cover is closed.

Next, the protector 300 will be described with reference to FIGS. 1-8 (mainly FIGS. 4A and 4B). The protector 300 is a member for holding and protecting a wire harness that is inserted through the hollow space of the grommet main body 100. The protector 300 is unified as a whole using, for example, a synthetic resin material that is higher in stiffness than the grommet main body 100 (a specific example is polypropylene (PP)).

The protector 300 has a first protector portion 310 which extends in the insertion direction and a second protector portion 320 which extends upward from a front end portion in the insertion direction, including the front end, of the first protector portion 310. In a state that the protector 300 is housed in the grommet main body 100, the first protector portion 310 is set in the first hollow space 103 and the second protector portion 320 is set in the second hollow space 106.

The first protector portion 310 has a bottom wall 311 which is approximately shaped like a flat plate. To enable housing of the first protector portion 310 in the first hollow space 103, the bottom wall 311 has a shape as obtained by reducing the grommet main body 100 a little while being kept similar to it when viewed from the pressing direction (more specifically, the front end surface of the bottom wall 311 is arc-shaped and projects forward and its rear end surface extends straightly in the width direction).

The bottom wall 311 is formed with, at halfway positions in the width direction that are symmetrical with respect to the center in the width direction, a pair of side walls 312 which are erected upward and extend in the insertion direction over the entire length of the bottom wall 311 in the insertion direction. A front wall 313 extends from the front ends of the pair of side walls 312 so as to be curved forward. Thus, the front end of a U-shaped groove that is formed by the bottom wall 311, the pair of side walls 312, and the front wall 313 and extends in the insertion direction is defined by the front wall 313 and its rear end is opened. A wire harness is disposed in this U-shaped groove (described later in detail).

The second protector portion 320 is composed of a pair of side walls 321 which are continuous with and extend upward from front end portions in the insertion direction, including the front ends, of the pair of side walls 312 and a front wall 322 which is continuous with the front wall 313, assumes approximately an arc shape, and extends upward. The front wall 322 is continuous with the front ends of the pair of side walls 321.

To allow the second protector portion 320 to be set in the second hollow space 106, the pair of side walls 321 and the front wall 322 have a shape as obtained by reducing the inner wall surfaces of the pair of side walls and the front wall of the rectangular-cylinder-shaped connection portion 105 of the grommet main body 100 a little while being kept similar to them when viewed from the pressing direction. The top end surface of the second protector portion 320 (i.e., the top end surfaces of the pair of side walls 321) are located above the top end surface of the first protector portion 310 (i.e., the top end surfaces of the pair of side walls 312). Thus, rear end surfaces 321a of the pair of side walls 321 are portions of steps, respectively.

The outer wall surface, in the width direction, of each side wall 321 is formed with plural (in this example, two) protector-side projections 330 which are spaced from each other in the insertion direction. Each protector-side projection 330 projects outward in the width direction and extends in the pressing direction from the top surface of the bottom wall 311 to the top end of the associated side wall 321 so as to connect the associated side wall 321 and the front portion of the associated side wall 312. The protector-side projections 330 are portions that are fitted in the respective first grommet-main-body-side recesses 107 in a state that the protector 300 is housed in the grommet main body 100 (described later in detail).

A cover 340 which is approximately shaped like a rectangular flat plate is unitized with a rear portion, in the insertion direction, of the bottom wall 311 via a hinge portion 341 on one side in the width direction. The cover 340 can be swung around the hinge portion 341 between an open state (see FIG. 4A) and a closed state (see FIG. 4B). In a state that the cover 340 is closed, a rear portion, in the insertion direction, of the above-mentioned U-shaped groove is formed by the bottom wall 311, the pair of side walls 312, and the front wall 313 is closed by the cover 340.

The cover 340 is formed with plural (in this example, two) lock projections 342 at prescribed positions that are spaced from each other in the insertion direction. In a state that the cover 340 is closed, the plural lock projections 342 are inserted in and locked on plural (in this example, two) respective lock holes (through-holes) 350 that are formed in the bottom wall 311 at prescribed positions that are spaced from each other in the insertion direction. This prevents an event that the closed cover 340 is opened unintentionally.

A tying portion 360 (see FIG. 2B etc.) extends down rearward (i.e., obliquely) from a portion, inside the pair of side walls 312 in the width direction, of the rear end surface of the bottom wall 311. The tying portion 360 is a portion for tying up and fixing a wire harness that is placed in the above-mentioned U-shaped groove (described later in detail).

Next, the outer member 400 will be described with reference to FIGS. 1, 2A, 2B, 3 and 6-8 (mainly FIG. 3). The outer member 400 is a member for fixing the grommet main body 100 to an attachment surface of an attachment target panel while pressing the grommet main body 100 against the attachment surface. The outer member 400 is unitized as a whole using, for example, a synthetic resin material that is higher in stiffness than the grommet main body 100 (a specific example is polypropylene (PP)).

The outer member 400 is shaped like a flat plate and extends in the width direction. The front surface of the outer member 400 is formed with, at a central position in the width direction, a rectangular recess 401 which is recessed rearward. The recess 401 is fitted with the rectangular-cylinder-shaped connection portion 105 of the grommet main body 100. Thus, the recess 401 is shaped so as to conform to the outer wall surfaces of the pair of side walls and the rear wall of the connection portion 105 when viewed from the pressing direction.

Each of the pair of inner wall surfaces (inner side surfaces), in the width direction, of the recess 401 is formed with plural (in this example, two) outer-member-side projections 402 at positions that are spaced from each other in the insertion direction. The outer-member-side projections 402 project inward in the width direction and extend in the pressing direction over the entire length, in the pressing direction, of the inner side surfaces of the recess 401. The outer-member-side projections 402 which are fitted in the respective second grommet-main-body-side recesses 108 in a state that the outer member 400 is attached to the grommet main body 100 (described later in detail).

A pair of bolt holes 403 to be used for fixing the outer member 400 (in other words, the grommet main body 100) to an attachment surface of an attachment target panel are formed through the outer member 400 at two respective end positions in the width direction.

Next, a description will be made of how to attach the above-configured grommet according to the embodiment.

First, a wire harness is inserted through the hollow space (i.e., the first hollow space 103, the second hollow space 106, and the internal space of the tubular member 200) of the grommet main body 100 and the tubular member 200.

After a portion, leading out of the insertion opening 104 of the grommet main body 100, of the wire harness is placed in the above-mentioned U-shaped groove in a state that the cover 340 is open, the cover 340 is closed with the wire harness set in the U-shaped groove in the protector 300.

A portion, leading out of the rear end of the protector 300, of the wire harness is tied up and fixed to the tying portion 360 (see FIG. 2B etc.) using a tying member such as a cable tie. In this manner, the wire harness is held reliably inside the protector 300 through cooperation between the cover 340 and the tying portion 360.

Subsequently, the protector 300 which holds the wire harness is inserted and placed in the hollow space (the first hollow space 103 plus the second hollow space 106) of the grommet main body 100 through the insertion opening 104 of the grommet main body 100 while deforming the grommet main body 100.

In a state that the protector 300 has been housed in the grommet main body 100 completely, as shown in FIG. 6 the first protector portion 310 is set in the first hollow space 103 and the second protector portion 320 is set in the second hollow space 106.

In addition, as shown in FIGS. 5A and 5B, the plural protector-side projections 330 are fitted in the respective first grommet-main-body-side recesses 107. In this state, as shown in FIG. 5A, the rear end surfaces 321a of the pair of side walls 321 are in contact with the inner wall surface of the rear wall of the connection portion 105. An event that the protector 300 comes off the hollow space of the grommet main body 100 unintentionally can thus be prevented by the fitting between the protector-side projections 330 and the first grommet-main-body-side recesses 107 and the contact between the rear end surfaces 321a of the pair of side walls 321 and the inner wall surface of the rear wall of the connection portion 105.

In the state that the protector 300 is housed in the grommet main body 100 completely, a rear end portion of the protector 300 is not covered with the end portion, defining the insertion opening 104, of the grommet main body 100. This facilitates work of inserting the protector 300 into the hollow space of the grommet main body 100.

Subsequently, the outer member 400 is attached to (i.e., the recess 401 is fitted with) the connection portion 105 of the grommet main body 100, whereby the outer member 400 is attached to the grommet main body 100. In a state that the outer member 400 has been attached to the grommet main body 100 completely, as shown in FIGS. 7A and 7B the plural outer-member-side projections 402 are fitted in the respective second grommet-main-body-side recesses 108.

As described above, in each side wall of the connection portion 105, a portion of the side wall of the connection portion 105 which is an elastic body exists between each of the first grommet-main-body-side recesses 107 and one or ones, adjacent to it in the insertion direction, of the second grommet-main-body-side recesses 108. Thus, as shown in FIG. 7B, in the state that the protector-side projections 330 are fitted in the respective first grommet-main-body-side recesses 107 and the outer-member-side projections 402 are fitted in the respective second grommet-main-body-side recesses 108, each of the protector-side projections 330 is opposed to an adjacent one or ones of the outer-member-side projections 402 in the insertion direction with a portion of the connection portion 105 (elastic body) interposed between them.

Hence, each protector-side projection 330 and each outer-member-side projection 402 that are opposed to each other push each other via the associated portion of the connection portion 105. As a result, the protector-side projections 330 are not prone to come off the first grommet-main-body-side recesses 107 and the outer-member-side projections 402 are not prone to come off the second grommet-main-body-side recesses 108. In this manner, the grommet main body 100, the protector 300, and the outer member 400 are connected to each other strongly.

The grommet main body 100 (plus the tubular member 200), the protector 300, and the outer member 400 are connected to each other in the above manner, whereby the grommet according to the embodiment in which the wire harness is inserted is completed. The grommet is attached to an attachment target panel by fixing the outer member 400 (in other words, the grommet main body 100) to an attachment surface of the attachment target panel using the pair of bolt holes 403 of the outer member 400 while pressing the former to the latter. In this state, the lip 109 (see FIGS. 6 and 8) of the grommet main body 100 comes into close contact with the attachment surface and exercises its function of water stopping between the grommet main body 100 and the attachment surface.

In the grommet according to the embodiment of the invention, since the rear end portion of the protector 300 is not covered with the end portion, defining the insertion opening 104, of the grommet main body 100, work of inserting the protector 300 into the hollow space of the grommet main body 100 is facilitated. Thus, the efficiency of work of inserting the protector 300 into the hollow space of the grommet main body 100 can be increased. In addition, in a state that the protector 300 is set in the hollow space of the grommet main body 100, the protector-side projections 330 are engaged with the respective first grommet-main-body-side recesses 107 and the rear end surfaces 321a of the side walls 321 are in contact with the inner wall surface of the rear wall of the connection portion 105. Thus, an event that the protector 300 comes off the hollow space of the grommet main body 100 unintentionally can be prevented.

Furthermore, each protector-side projection 330 is shaped like a rib that connects the front portion of the associated side wall 312 of the first protector portion 310 and the associated side wall 321 of the second protector portion 320. As such, the protector-side projections 330 have not only the function of locking the protector 300 but also a function of reinforcing the portions where the first protector portion 310 and the second protector portion 320 are connected to each other.

<Other Embodiments>

The present invention is not limited to any of the aforementioned embodiments, but various modifications may be made within the scope of the invention.

For example, although in the above embodiment the outer member 400 is provided separately from the grommet main body 100, a configuration is possible in which the outer member 400 is omitted and a portion corresponding to the outer member 400 is unitized with the grommet main body 100.

Although in the above embodiment the tubular member 200 is integrated with the grommet main body 100, the tubular member 200 need not always be connected to the grommet main body 100.

Here, the features of the aforementioned embodiments of the grommet according to the invention will be summarized and listed briefly in the following items [1] and [2].

[1] A grommet comprising:
a hollow grommet main body comprising an elastic material; and
a protector placed in a hollow space of the grommet main body,
the protector having: a deep-side end portion located in a deep-side area of the hollow space; an opening-end-side end portion located in an opening-end-side area of the hollow space; and a protector-side engagement portion engaged with the grommet main body upon the protector being placed in the grommet main body,
the grommet main body having a grommet-main-body-side engagement portion to exert a preventive force to the protector-side engagement portion for preventing separation of the protector from the grommet main body, while eliminating a structure to exert the preventive force to the opening-end-side end portion.

[2] The grommet according to the item [1], wherein
the hollow space of the grommet main body has a bent portion to have a bent shape,
the protector has: a first protector portion extending toward one side from the bent position along the shape of the hollow space; and a second protector portion extending toward the other side from the bent position along the shape of the hollow space,
the protector-side engagement portion has a rib shape connecting an outer wall surface of the first protector portion and an outer wall surface of the second protector portion.

REFERENCE SIGNS LIST

100: Grommet main body
103: First hollow space (hollow space)
104: Insertion opening
106: Second hollow space (hollow space)
107: First recess (grommet-main-body-side engagement portion)
300: Protector
310: First protector portion
320: Second protector portion
330: Protector-side projection (protector-side engagement portion)

The invention claimed is:
1. A grommet comprising:
a hollow grommet main body comprising an elastic material; and
a protector placed in a hollow space of the grommet main body,
the protector having: a deep-side end portion located in a deep-side area of the hollow space; an opening-end-side end portion located in an opening-end-side area of the hollow space; and a protector-side engagement portion engaged with the grommet main body upon the protector being placed in the grommet main body,
the grommet main body having a grommet-main-body-side engagement portion to exert a preventive force to the protector-side engagement portion configured to prevent separation of the protector from the grommet main body without separate pressing engagement between the protector and the grommet main body at the opening-end-side end portion.

2. The grommet according to claim 1, wherein
the hollow space of the grommet main body has a bent portion to have a bent shape,
the protector has: a first protector portion extending toward one side from the bent portion along the shape of the hollow space; and a second protector portion extending toward the other side from the bent portion along the shape of the hollow space,
the protector-side engagement portion has a rib shape connecting an outer wall surface of the first protector portion and an outer wall surface of the second protector portion.

3. The grommet according to claim 1, wherein the protector-side engagement portion projects outward in a width direction perpendicular to an insertion direction of the protector.

4. The grommet according to claim 3, wherein the protector-side engagement portion is formed with plural projections which are spaced from each other in the insertion direction.

* * * * *